(12) United States Patent
Waltermann et al.

(10) Patent No.: US 9,998,665 B2
(45) Date of Patent: Jun. 12, 2018

(54) CAMERA MODE SELECTION BASED ON CONTEXT

(71) Applicant: Lenovo (Singapore) Pte. Ltd., Singapore (SG)

(72) Inventors: Rod D. Waltermann, Rougemont, NC (US); Aaron Michael Stewart, Raleigh, NC (US); Robert James Kapinos, Durham, NC (US); Christopher Miles Osborne, Cary, NC (US); Michael William Stuart Ripp, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days. days.

(21) Appl. No.: 14/336,806

(22) Filed: Jul. 21, 2014

(65) Prior Publication Data

US 2016/0021311 A1  Jan. 21, 2016

(51) Int. Cl.
*H04N 5/232* (2006.01)
*H04N 5/225* (2006.01)
*H04N 5/247* (2006.01)
*H04N 7/14* (2006.01)

(52) U.S. Cl.
CPC ....... *H04N 5/23245* (2013.01); *H04N 5/2258* (2013.01); *H04N 5/247* (2013.01); *H04N 2007/145* (2013.01)

(58) Field of Classification Search
CPC .. H04N 5/23245; H04N 5/247; H04N 5/2258; H04N 2007/145
See application file for complete search history.

(56) References Cited

U.S. PATENT DOCUMENTS

| | | | | |
|---|---|---|---|---|
| 2011/0045812 | A1* | 2/2011 | Kim | G06F 1/1626 455/418 |
| 2011/0164105 | A1* | 7/2011 | Lee | H04N 7/142 348/14.02 |
| 2012/0229380 | A1* | 9/2012 | Silvester | G06F 1/1626 345/158 |
| 2013/0154955 | A1* | 6/2013 | Guard | G06F 1/1626 345/173 |
| 2013/0329100 | A1* | 12/2013 | Desai | H04N 5/2258 348/262 |
| 2015/0116501 | A1* | 4/2015 | McCoy | G06T 7/2093 348/169 |

FOREIGN PATENT DOCUMENTS

| | | |
|---|---|---|
| CN | 102685306 A | 9/2012 |
| CN | 103037083 A | 4/2013 |
| DE | 202012102966 U1 | 9/2012 |

\* cited by examiner

*Primary Examiner* — Ahmed A Berhan
(74) *Attorney, Agent, or Firm* — Ference & Associates LLC

(57) ABSTRACT

An aspect provides a method, including: obtaining, using one or more sensors of a device, contextual data relating to a picture taking context; assigning, using a processor, the contextual data to a predetermined picture taking context; and selecting a camera from two or more cameras of the device based on the predetermined picture taking context. Other aspects are described and claimed.

18 Claims, 3 Drawing Sheets

CAMERA MODE SELECTION BASED ON CONTEXT

BACKGROUND

Information handling devices ("electronic devices" or "devices"), for example smart phones, tablet computing devices, laptop computing device, etc., have picture taking (including video) capabilities. Often such devices are mobile and include more than one camera, e.g., a front or user facing camera and a back or world viewing camera.

Each camera of a multi-camera device is different. Sometimes the difference is simply location, e.g., one camera on each side of the device. Typically, however, the front or user facing camera is of lower quality (e.g., has reduced resolution, reduced settings capabilities, lacks video capture capability, etc.), as compared with a back or world viewing camera. Device manufacturers often choose a reduced quality camera for the front or user facing camera because this camera is typically used for self portraits or "selfies", i.e., pictures of user(s) within arm's length of the camera. Thus, the camera often does not need to be of particularly high quality.

A user may switch which camera is active or controlling the view. This may be accomplished for example by operating a settings control, often a mechanical or soft button, e.g., placed on a touch screen interface of the device. Thus, a user may manually select which camera is operative and will capture the image(s) for the picture and/or video content.

BRIEF SUMMARY

In summary, one aspect provides a method, comprising: obtaining, using one or more sensors of a device, contextual data relating to a picture taking context; assigning, using a processor, the contextual data to a predetermined picture taking context; and selecting a camera from two or more cameras of the device based on the predetermined picture taking context.

Another aspect provides an electronic device, comprising: a display device; two or more cameras; one or more processors; and a memory operatively coupled to the one or more processors, the display device, and the two or more cameras, the memory storing instructions executable by the one or more processors to: obtain contextual data relating to a picture taking context; assign the contextual data to a predetermined picture taking context; and select a camera from the two or more cameras based on the predetermined picture taking context.

A further aspect provides a computer program product, comprising: a storage device that stores instructions executable by a processor, the instructions comprising: instructions that obtain, using one or more sensors of a device, contextual data relating to a picture taking context; instructions that assign the contextual data to a predetermined picture taking context; and instructions that select a camera from two or more cameras of the device based on the predetermined picture taking context.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
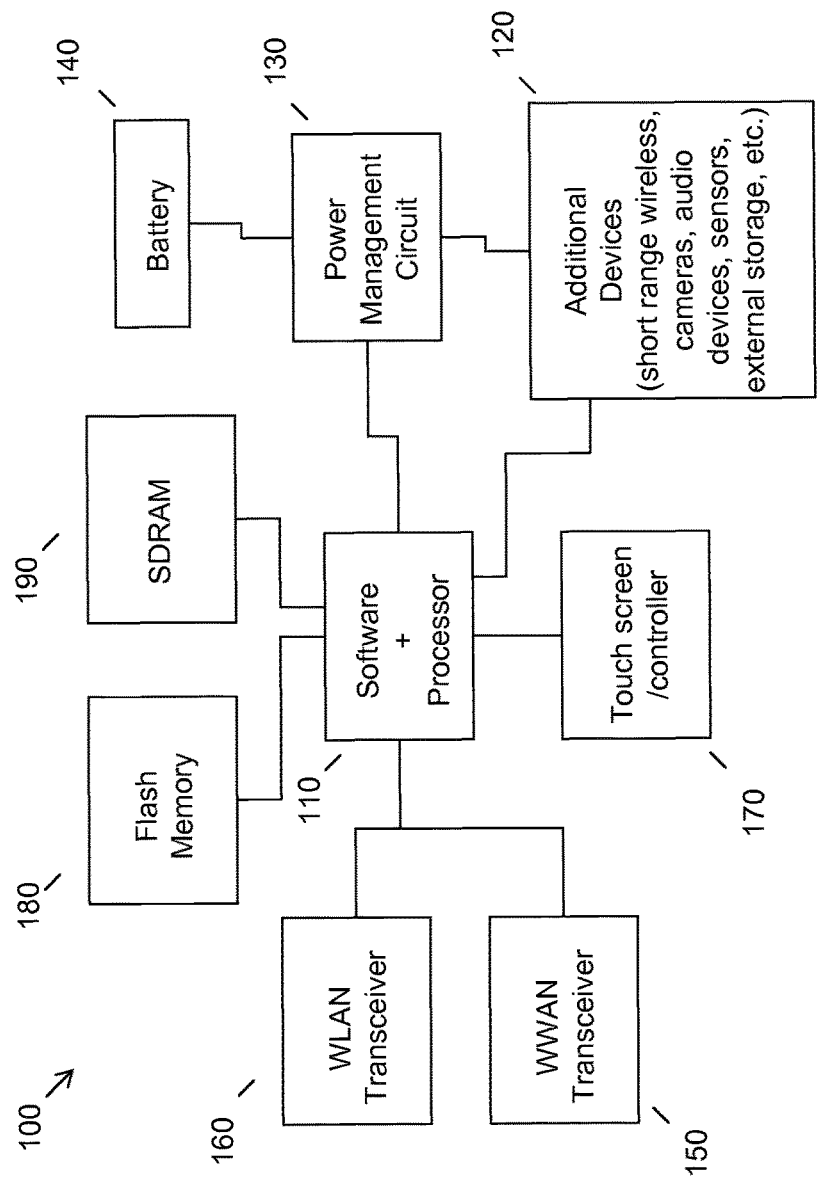
FIG. 1 illustrates an example information handling device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Rather than requiring a user to know of and operate manual inputs to switch between cameras (often users will not even realize there is a front facing camera, much less how to activate it), an embodiment automatically selects an appropriate camera for the user based on context. If the user is happy with the selection, the user may continue with his or her picture and/or video taking Otherwise, an embodiment may provide a convenient way to switch the automatic selection such that the user may operate another available camera.

For example, in one embodiment, based on the user's hand position with respect to the device, e.g., as detected via touch sensors in the touch screen or elsewhere on the device's surface, an embodiment may select an appropriate camera (e.g., front or rear facing camera). Thus an embodiment maps the contextual data derived from user-device contact data to infer a picture taking context (e.g., selfie, worldview picture, etc.) and switch a mismatched camera automatically for the user.

By way of example, if a user is holding a tablet screen, his or her fingers are on the screen while the palm and thumb are on the back side. Likewise if the user is pointing the screen at them selves, the palm and thumb are both on or near the screen, and the fingers are on the back side. This type of grip or contact is detectable, e.g., using device contact sensors, and may be used to determine that the photo is a selfie versus a worldview shot of friends. An embodiment may therefore use such contextual data to rotate or switch between cameras on a two camera tablet.

In some cases, a device will have more sensors from which to obtain contextual data. In such cases, an embodiment may adjust or refine the picture taking inference to automatically switch cameras for the user. By way of example, device orientation sensors may be used to map a particular holding orientation, e.g., angled downward at the user, alone or in combination with device contact sensor data, to determine the picture taking context. Thus, the combination of devices sensors may further inform which picture taking context is being encountered and automatically adjust the camera selection appropriately.

As a further example, a device sensor such as an accelerometer may provide device movement information. Such information is useful in determining what particular picture taking context is operative, allowing an embodiment to intelligently guess which camera should control the view. By way of example, when taking a self portrait picture, a user often activates a camera application and then proceeds to extend his or her arm outwardly to take the picture. Such device movement may be sensed and used to automatically switch a default active camera to another camera. This picture context sensing using the accelerometer again may be used in combination with other sensor derived contextual data (e.g., user-device contact data, device orientation data, etc.).

In addition to switching between available cameras for the user, an embodiment may additionally switch other camera related device components. By way of example, on a multi screen system, an embodiment may determine which screen the user is viewing and show the image preview or resultant picture/video on the correct screen.

An embodiment may further provide useful notifications to the user regarding the cameras and/or other device components. For example, an embodiment may provide a notification regarding the automatic switching, before and/or after the automatic switching is implemented. This will apprise the user that the device has or may in the future implement an automatic switch between cameras. This may take the form of a prompt for confirmation. The notification may also include information related to the cameras, e.g., notifying the user that the front facing camera is of reduced resolution, cannot capture video, etc. The notification may take a variety of forms with respect to modality, e.g., visual display on a touch screen, audible feedback, haptic feedback, etc.

The illustrated example embodiments will be best understood by reference to the figures. The following description is intended only by way of example, and simply illustrates certain example embodiments.

While various other circuits, circuitry or components may be utilized in information handling devices, with regard to smart phone or tablet circuitry 100, an example illustrated in FIG. 1 includes a system design found for example in tablet or other mobile computing platforms. Software and processor(s) are combined in a single unit 110. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces for example include SDIO and I2C.

There are power management circuits(s) 130, e.g., a battery management unit, BMU, which manage power as supplied for example via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., front and rear facing cameras, device sensors, etc. Additional devices 120 also may include short range wireless radio(s), such as BLUETOOTH radios, for communicating with other devices over different types of networks, e.g., short range wireless or personal area networks. Near field communication element(s) may also be included as additional network component(s) or device(s) 120. Commonly, system 100 will include a touch screen/controller 170 for data input and display as well as user-device contact sensing. System 100 also typically includes various memory devices, for example flash memory 180 and SDRAM 190.

Figure 2:
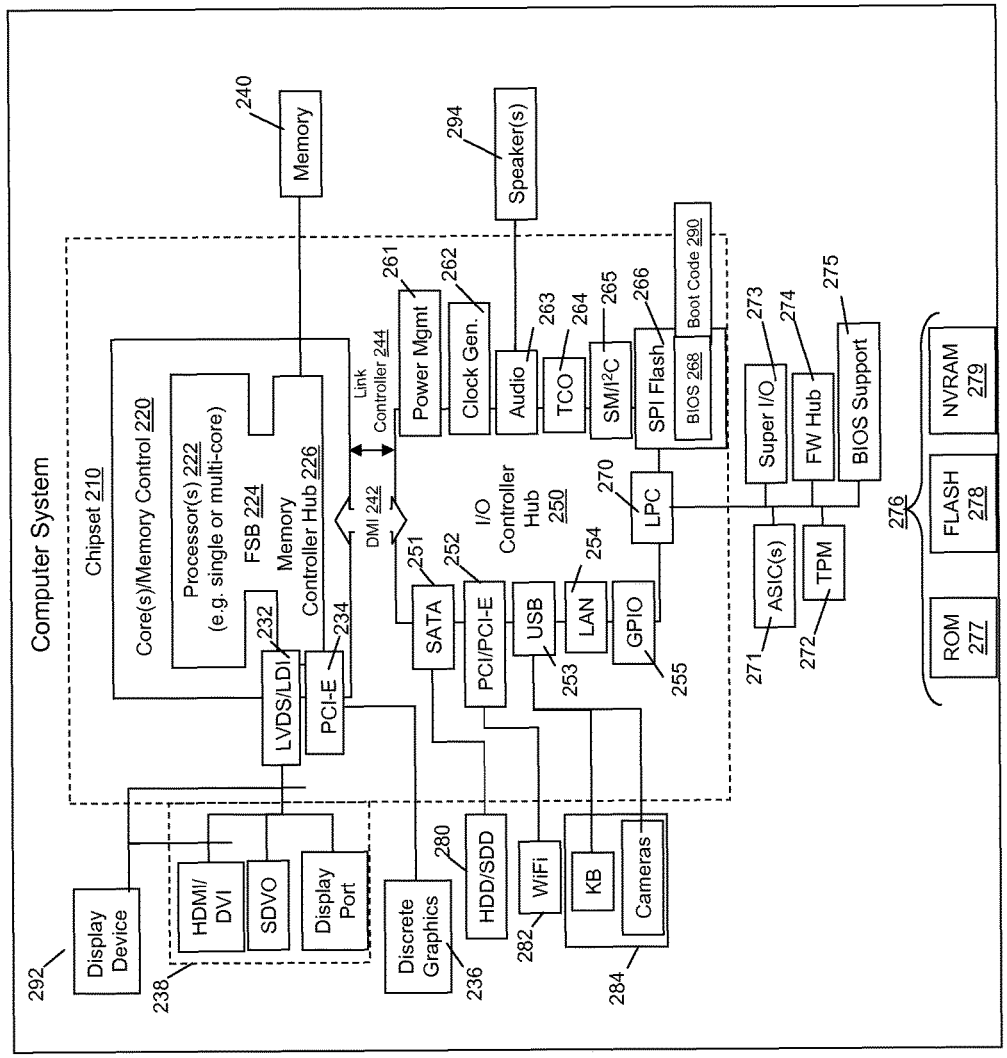
FIG. 2 illustrates another example information handling device.

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a set 210 (a group of integrated circuits that work together) with an architecture that may vary depending on manufacturer (for example, INTEL, AMD, ARM, etc.). INTEL is a registered trademark of Intel Corporation in the United States and other jurisdictions. AMD is a registered trademark of Advanced Micro Devices, Inc. in the United States and other jurisdictions. ARM is a trademark of ARM Holdings plc in various jurisdictions.

The architecture of the set 210 includes a core and memory control group 220 and an I/O controller hub 250 that exchanges information (for example, data, signals, commands, etc.) via a direct management interface (DMI) 242 or a link controller 244. In FIG. 2, the DMI 242 is an interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a unit that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280, etc.), a PCI-E interface 252 (for example, for wireless connections 282), a USB interface 253 (for example, for devices 284 such as a digitizer, keyboard, mice, cameras, phones, micro-phones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, and personal computing devices generally, and/or other electronic devices with which users capture images for pictures and/or videos. "Picture(s)" is used as a term throughout that is inclusive of images generally, whether they are used for providing individual pictures, audio/video data, panoramic images, etc. As will be understood by those having skill in the art, devices including circuitry such as outlined in FIG. 1 and/or FIG. 2 (or some combination thereof) often include more than one camera, e.g., a front/user facing camera and a back/worldview camera.

Figure 3:
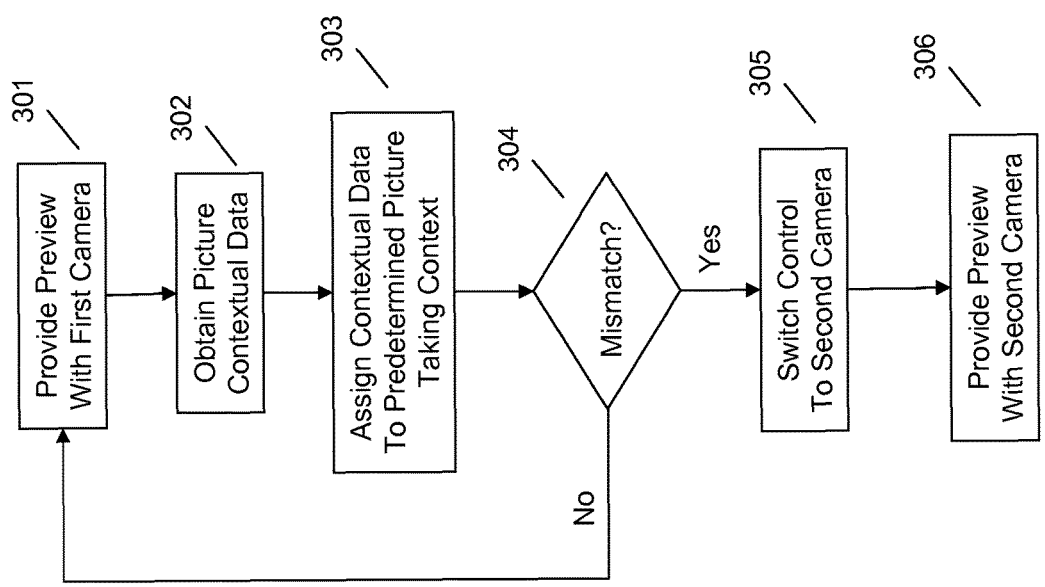
FIG. 3 illustrates an example method for camera mode selection based on context.

Referring to FIG. 3, an embodiment provides a method for camera mode selection based on context. In an embodiment, following the opening of a camera application on a smart phone, tablet or like electronic device, the user is provided at 301 with a preview of a picture, e.g., on a touch screen or like display, using a first camera disposed on a first side of the electronic device. This is the view of the default camera, e.g., the camera selected by the device without further user input on application launch. Often this will be the camera which was last used.

An embodiment thereafter obtains, at 302, contextual data relating to a picture taking context. As described herein, this may correspond to obtaining data from various device sensors, non-limiting examples of which include user-device contact sensors (for example provided in a touch screen display and/or other surface of the device), device sensors (e.g., 9-axis orientation sensor module, gravity sensor, compass, etc.), and a device accelerometer. These sensors are used to obtain contextual data that relates to the picture taking context, i.e., the state of the device during an active camera application.

An embodiment uses programmed logic to assign the contextual data obtained at 302 to a predetermined picture taking context at 303. By way of example, particular detected user-device contacts may be mapped to a predetermined picture taking context. A typical example includes detection of a user's fingers at or near the side of a touch screen, detection of a user's hand at or near the back surface of the device, and detection of the user's thumb on the front side of the device. Such user-device contact data may be mapped for example to a self portrait mode, i.e., counseling activation of the user/front facing camera as opposed to the back/worldview camera.

At 304, an embodiment uses the assignment data to determine that the predetermined picture taking context does not match the first camera, i.e., the camera activated by default upon opening or launching of the camera application. If such a determination is not made, the camera that is active matches the picture taking context according to the contextual data obtained at 302 and no change is needed.

However, if such a mismatch is determined at 304 an embodiment may thereafter automatically switch control to a second camera at 305, e.g., deactivate the back/worldview camera in favor of activating the front/user facing camera. Thus, the user will be provided with the data of the second camera in the preview of the picture, e.g., displayed on the touch screen. This permits the user to operate the second camera to obtain the picture (which again may include taking a video, etc.).

This conveniently switches control between the device cameras for the user based on detected contextual data and an inferred picture taking context. Many users that are unfamiliar with the device layout (e.g., the existence of more than one camera, how to switch there-between, etc.) will find this useful in that the device assists in making the camera selection that is appropriately mapped to the picture taking context.

In an embodiment, by way of example, the contextual data obtained at 302 may include device accelerometer data, e.g., a sudden and short outward device movement (with respect to the user's body), which may be mapped at 303 to a self portrait picture taking context. If so, an embodiment may assign such a temporary acceleration to a front facing camera picture context. This permits an embodiment, at 304, to determine if the front facing camera is active, and if not, at 305 switch control to the front facing camera to the user.

By way of further example, the contextual data obtained at 302 may include user-device contact data, e.g., mapping to a worldview picture taking context. Such data may for example correspond to a user holding the device with two hands, with two thumbs contacting a lower edge of the device. This user-device contact data may be combined with other data, e.g., device orientation data such as data indicating that the device is in a landscape orientation. If so, the assigning at 303 may include mapping user-device contact, alone or in combination with other data, to a predetermined worldview picture taking context. If so, an embodiment may determine if the back/worldview facing camera is active at 304 and if not, at 305 switch control from another camera to the worldview camera.

Similarly, other user-device contact data may be indicative of another predetermined picture taking context, e.g., self portrait picture taking context. For example, the user-device contact data obtained at 302 may include a single thumb contact on the touch screen display. If so, an embodiment may assign this contextual data to a predetermined self portrait picture taking context at 303 and, if the front/user facing camera, as determined at 304, is not active, an embodiment may switch control at 305 to the user/front facing camera. Thus, an embodiment may select or switch to the camera that is located on a side of the device detecting user thumb contact.

As described herein, a user may find it beneficial to be apprised of what the system is doing with respect to automatic camera selection and/or the implications thereof. Thus, an embodiment may provide an indication regarding the automatic switching. This will let the user know that automatic switching is possible and/or has been implemented. In an embodiment, a user interface (e.g., GUI presented on a touch screen) may be provided such that the user may confirm or undo or reverse the automatic switching.

Likewise, the indication may include image quality information. For example, an embodiment may notify the user that switching to the front/user facing camera will produce images of lower resolution or quality, offer fewer controls (e.g., contrast adjustment, light balance, etc.) and/or that the camera may or may not be used for video. Additionally, an embodiment may provide a notification that the other device camera(s), which may include external cameras (e.g., connected via USB cable, wirelessly coupled to the device, etc.) have expanded capabilities, views, etc.

Therefore, as described herein, embodiments provide for automatic switching of cameras, e.g., between a front facing mode and a worldview mode, such that a user will have a default camera selected that more closely matches the picture taking context. Embodiments make the picture taking experience more manageable given the expanded capabilities of modern mobile devices, e.g., that often include more than one camera with different views and capabilities.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal, is non-transitory, and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication or short range wireless communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    obtaining, using one or more sensors of a device, contextual data relating to a picture taking context, wherein the picture taking context is associated with a side of the device selected from a first side of the device and a side substantially opposite of the first side of the device and wherein the contextual data is associated with a hand contact position with respect to the device;
    identifying, using a processor, that the contextual data matches a predetermined picture taking context, wherein the predetermined picture taking context is assigned to a camera from two or more cameras of the device;
    wherein one of the two or more cameras is disposed on the first side of the device and wherein a second of the two or more cameras is disposed on the side of the device substantially opposite of the first side of the device;
    activating, automatically without additional user input, the camera assigned to the predetermined picture taking context;
    determining that the predetermined picture taking context does not match a first camera;
    responsive to the determining, automatically switching the activation to a second camera; and
    responsive to the switching, displaying notification of the activation of the second camera.

2. The method of claim 1, wherein the contextual data includes user-device contact data.

3. The method of claim 1, wherein the contextual data includes device orientation data.

4. The method of claim 1, wherein the contextual data includes device accelerometer data.

5. The method of claim 1, wherein the contextual data includes user-device contact data, device orientation data, and device accelerometer data.

6. The method of claim 1, wherein:
the contextual data includes user digit contact data; and
the identifying comprises associating the user digit contact data to a predetermined picture taking context.

7. The method of claim 6, wherein the activated camera is located on a side of the device detecting user digit contact.

8. The method of claim 1, wherein:
the contextual data includes device accelerometer data;
the identifying comprises detecting acceleration a front facing camera; and
the activating comprises switching control to the front facing camera.

9. The method of claim 1, wherein:
the contextual data includes user-device contact data; and
identifying comprises associating user thumb contact to a predetermined picture taking context.

10. An electronic device, comprising:
a display device;
two or more cameras;
one or more processors; and
a memory operatively coupled to the one or more processors, the display device, and the two or more cameras of the device, the memory storing instructions executable by the one or more processors to:
obtain contextual data relating to a picture taking context, wherein the picture taking context is associated with a side of the device selected from a first side of the device and a side substantially opposite of the first side of the device and wherein the contextual data is associated with a hand contact position with respect to the device;
identify that the contextual data matches to a predetermined picture taking context, wherein the predetermined picture taking context is assigned to a camera from two or more cameras of the device;
wherein one of the two or more cameras is disposed on the first side of the device and wherein a second of the two or more cameras is disposed on the side of the device substantially opposite of the first side of the device;
activate, automatically without additional user input, the camera assigned to the predetermined picture taking context;
determine that the predetermined picture taking context does not match a first camera;
thereafter, automatically switch to a second camera; and
responsive to switching, display a notification thereof.

11. The electronic device of claim 10, further comprising one or more device sensors that sense user device contact, wherein the contextual data includes user-device contact data.

12. The electronic device of claim 10, further comprising one or more device sensors that sense device orientation, wherein the contextual data includes device orientation data.

13. The electronic device of claim 10, further comprising one or more device sensors that sense device acceleration, wherein the contextual data includes device accelerometer data.

14. The electronic device of claim 10, further comprising one or more device sensors, wherein the contextual data includes sensed user-device contact data, device orientation data, and device accelerometer data.

15. The electronic device of claim 10, further comprising one or more device sensors that sense user device contact, wherein:
the contextual data includes user digit contact data; and
to identify comprises associating the user digit contact data to a predetermined picture taking context.

16. The electronic device of claim 15, wherein the activated camera is located on a side of the electronic device detecting user digit contact.

17. The electronic device of claim 10, further comprising one or more device sensors that sense device acceleration, wherein:
the contextual data includes device accelerometer data;
to identify comprises detecting acceleration of a front facing camera; and
to activate comprises switching control to the front facing camera.

18. A computer program product, comprising:
a storage device that stores instructions executable by a processor, the instructions comprising:
instructions that obtain, using one or more sensors of a device, contextual data relating to a picture taking context, wherein the picture taking context is associated with a side of the device selected from a first side of the device and a second side substantially opposite of the first side of the device and wherein the contextual data is associated with a hand contact position with respect to the device;
instructions that identify that the contextual data matches to a predetermined picture taking context, wherein the predetermined picture taking context is assigned to a camera from two or more cameras of the device;
wherein one of the two or more cameras is disposed on the first side of the device and wherein a second of the two or more cameras is disposed on the side of the device substantially opposite of the first side of the device;
instructions that activate, automatically without additional user input, the camera assigned to the predetermined picture taking context;
code that determines that the predetermined picture taking context does not match a first camera; code that thereafter, automatically switches to a second camera; and
responsive to switching, code that displays a notification thereof.

* * * * *